US011754301B2

(12) United States Patent
Lotfi et al.

(10) Patent No.: US 11,754,301 B2
(45) Date of Patent: Sep. 12, 2023

(54) MIST HUMIDIFIER BLOWER METHODS AND SYSTEMS

(71) Applicant: CONDAIR GROUP AG, Pfäffikon/SZ (CH)

(72) Inventors: Shahram Lotfi, Orleans (CA); Tobias Franciscus Hendrikus Bakker, 's-Hertogenbosch (NL)

(73) Assignee: CONDAIR GROUP AG, Pfäffikon/SZ (CH)

( * ) Notice: Subject to any disclaimer, the term of this patent is extended or adjusted under 35 U.S.C. 154(b) by 140 days.

(21) Appl. No.: 17/224,803

(22) Filed: Apr. 7, 2021

(65) Prior Publication Data

US 2021/0222894 A1 Jul. 22, 2021

Related U.S. Application Data

(62) Division of application No. 16/523,171, filed on Jul. 26, 2019, now Pat. No. 11,300,304.

(30) Foreign Application Priority Data

Jul. 9, 2019 (CA) ................................ CA 3049382

(51) Int. Cl.

*F24F 6/12* (2006.01)
*F24F 6/14* (2006.01)
*F24F 6/00* (2006.01)
*F24F 6/02* (2006.01)

(52) U.S. Cl.

CPC .................. *F24F 6/12* (2013.01); *F24F 6/02* (2013.01); *F24F 2006/008* (2013.01); *F24F 2006/143* (2013.01)

(58) Field of Classification Search

CPC .......... F24F 6/12; F24F 6/02; F24F 2006/008; F24F 2006/143; F24F 13/20
See application file for complete search history.

(56) References Cited

U.S. PATENT DOCUMENTS 3,801,077 A * 4/1974 Pearson .................... F24F 6/18 261/DIG. 15
3,855,371 A * 12/1974 Morrow .................... F24F 6/12 261/DIG. 15
5,837,105 A * 11/1998 Stober ...................... B01D 1/30 203/99
6,739,585 B1 * 5/2004 Urbanski ............... B01D 3/008 261/114.5
9,791,165 B2 * 10/2017 McKay ..................... F24F 6/02
(Continued)

*Primary Examiner* — Stephen Hobson
(74) *Attorney, Agent, or Firm* — Greer, Burns & Crain, Ltd

(57) ABSTRACT

Mist based humidification systems are employed in numerous environments. However, such systems are typically small portable units whilst it would be beneficial to employ ultrasonic based mist humidifiers in larger environments. However, these environments introduce additional requirements such as reducing the emission/distribution of condensed water as droplets from the humidifier, allowing independent placement of the mist generator from the mist distribution element(s), and the requirement to "throw" the mist a reasonable distance into the environment rather than relying upon the circulation within the environment to achieve distribution. Embodiments of the invention address these issues whilst also supporting modular humidification systems operating at multiple capacities.

11 Claims, 11 Drawing Sheets

(56) References Cited

U.S. PATENT DOCUMENTS 10,281,164 B2 * 5/2019 Daley ..................... B01F 25/30
10,408,478 B2 * 9/2019 Staniforth ............... F24F 13/26
2004/0026539 A1 * 2/2004 Herr ......................... D21G 7/00 239/602
2007/0137482 A1 * 6/2007 Xu ......................... B01D 3/324 95/198
2007/0284765 A1 * 12/2007 Wang ................... F24F 11/0008 261/DIG. 65
2010/0162890 A1 * 7/2010 Xu ........................... B01D 3/20 55/320
2010/0162891 A1 * 7/2010 Xu ......................... B01D 3/008 261/114.1
2010/0163397 A1 * 7/2010 Xu ......................... B01D 3/008 202/162
2010/0242730 A1 * 9/2010 Heldwein ................ B01D 3/20 261/114.5
2011/0031636 A1 * 2/2011 Ediger .................. B05B 7/0075 261/78.2
2011/0303089 A1 * 12/2011 Xu ......................... B01D 3/324 95/213
2013/0334716 A1 * 12/2013 Ching ....................... F24F 6/12 261/142
2015/0338119 A1 * 11/2015 MCGarva ............... F24F 6/043 261/79.2
2016/0033150 A1 * 2/2016 Staniforth ........... B01F 23/2133 261/30
2016/0123611 A1 * 5/2016 Daley ....................... F24F 6/02 261/119.1
2016/0169537 A1 * 6/2016 Lu ........................... F24D 13/00 422/123
2016/0169541 A1 * 6/2016 Lu ............................. F24F 6/00 422/121
2017/0023268 A1 * 1/2017 Chan ....................... F24F 13/26
2017/0122604 A1 * 5/2017 Song ......................... F24F 6/12
2017/0203323 A1 * 7/2017 Gschwind ............. B05B 12/081
2017/0227242 A1 * 8/2017 Kimura ................ H05K 7/2069
2017/0356663 A1 * 12/2017 Couperthwaite ....... F28F 13/06
2018/0172300 A1 * 6/2018 Conrad ................. F24F 1/0087
2020/0063991 A1 * 2/2020 Bae ....................... F24F 13/065
2021/0180816 A1 * 6/2021 Lotfi ......................... F24F 6/18
2022/0325907 A1 * 10/2022 Lin ........................... F24F 6/14

* cited by examiner

MIST HUMIDIFIER BLOWER METHODS AND SYSTEMS

RELATED APPLICATIONS

This application is a divisional of, and claims priority under 35 U.S.C. 120 from Ser. No. 16/523,171, filed Jul. 26, 2019, which is incorporated by reference.

FIELD OF THE INVENTION

This patent application relates to mist humidifiers and more specifically to blower packs for mist humidifiers.

BACKGROUND

A humidifier is a device, primarily an electrical appliance that increases humidity (moisture) in an environment, e.g. a single room or an entire building. In the home, point-of-use humidifiers are commonly used to humidify a single room, while whole-house or furnace humidifiers, which connect to a home's heating, ventilation and air conditioning (HVAC) system, provide humidity to the entire house. Medical ventilators often include humidifiers for increased patient comfort. Large humidifiers are used in commercial, institutional, or industrial contexts, often as part of a larger HVAC system.

Such humidifiers may exploit different techniques including, for example, evaporative or natural humidifiers employing a wick, vaporizers which heat or boil the water, impeller humidifiers, and ultrasonic humidifiers. Irrespective of the means of introducing moisture into the air this air must be moved from the humidifier into the environment in order to humidify the environment. Where the humidifier is integrated into a HVAC system then the air mover is the fan/blower within the furnace and/or air conditioner of the HVAC system. However, in many applications the humidifier is employed independent of any HVAC system and accordingly there exists a requirement for a standalone blower pack for use in conjunction with the humidifier.

Within prior art humidification systems recirculation of the air within the humidifier can result in condensation within the system after the chamber or chambers which can subsequently result in droplets being emitted/distributed from the humidifier into the local environment, commonly referred to as "spitting." Accordingly, it would be beneficial to provide a distribution means which efficiently distributes the mist into the air and avoids such "spitting."

It would be further beneficial for the distribution means to support distribution of the mist directly from the humidification system or remotely from the humidification system via intermediate ducting. It would be further beneficial for the distribution means to support "throwing" of the mist into the environment rather than relying upon circulation within the environment to achieve this.

Other aspects and features of the present invention will become apparent to those ordinarily skilled in the art upon review of the following description of specific embodiments of the invention in conjunction with the accompanying figures.

SUMMARY

It is an object of the present invention to mitigate limitations within the prior art relating to mist humidifiers and more specifically to blower packs for mist humidifiers.

In accordance with an embodiment of the invention there is provided a system comprising:

a frame to which a mist channel and a pressurised box are mechanically mounted;

the mist channel comprising:

an outlet disposed at one end; and an inlet at another distal end of the mist channel;

the pressurised box comprising:

a first portion enclosing a first predetermined portion of the mist channel on an upper side of the mist channel having an opening at the outlet of the mist channel and an inlet at a second distal end;

a second portion enclosing a second predetermined portion of the mist channel on a lower side of the mist channel having an opening at the outlet of the mist channel and an inlet at a second distal end; wherein at least one of a lower internal surface of the mist channel and an upper internal surface of the mist channel have a slope relative to a horizontal plane of the frame from the outlet of the mist channel towards the inlet of the mist channel.

In accordance with an embodiment of the invention there is provided a method of transporting a mist of a liquid carried by a first gas into an environment comprising:

providing a mist generator for generating a mist of a liquid within the first gas;

providing a mist channel comprising an inlet for receiving an output of the mist generator and an outlet; and providing a blower pack around the outlet of the mist channel for generating a flow of a second gas which is combined with a flow of mist from the outlet of the mist channel; wherein the blower pack provides for increased projection of the mist into the environment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
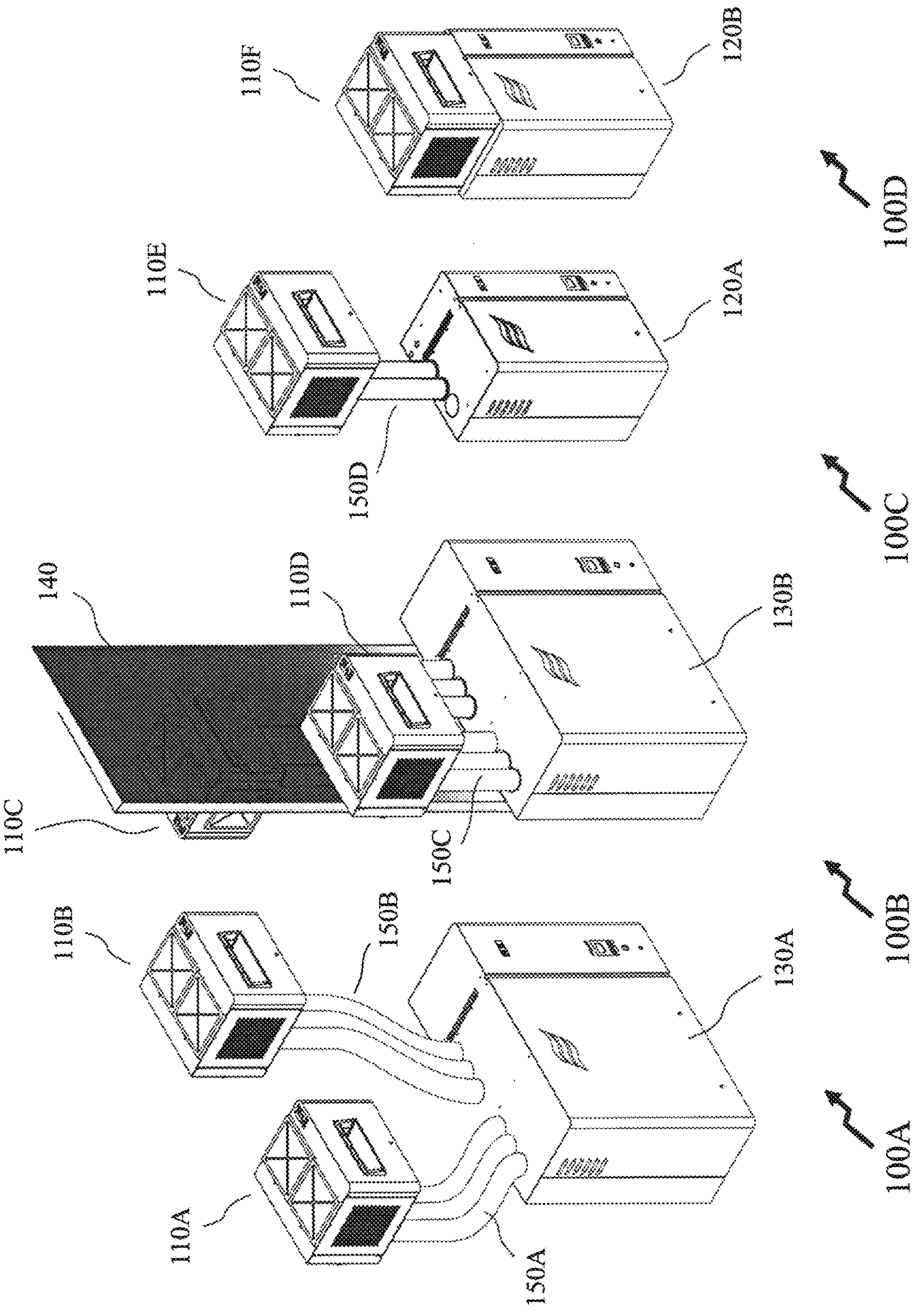
FIG. 1A depicts exemplary configurations for mist humidifiers exploiting blower packs according to an embodiment of the invention.

The present description is directed to mist humidifiers and more specifically to blower packs for mist humidifiers.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "mist humidifier" as used herein and throughout the disclosure may comprise, but not be limited to, a warm mist humidifier and/or a cool mist humidifier. A cool mist humidifier may exploit an internal wick filter to absorb water whilst an ultrasonic based cool mist humidifier uses ultrasonic vibration technology to create a micro-fine cool mist. A warm mist humidifier uses an internal heating element that boils water before releasing it. A mist humidifier therefore is a specific form of mist generator which generates a mist in that it creates a mist of water droplets. Other liquids may be employed.

A "mist" as used herein and throughout the disclosure may comprise, but not be limited to, a suspension of small droplets of a liquid within a gas. For example, this may be water in air.

Within the following description in respect of FIGS. 1A to 15 respectively blower packs according to embodiments of the invention are described and depicted in conjunction with an ultrasonic mist humidification unit. However, it would be evident that within other embodiments of the invention a blower pack according to an embodiment of the invention may be employed with humidification units exploiting other cool mist humidification techniques and/or warm mist humidification techniques.

Further, within the following description in respect of FIGS. 1A to 15 respectively blower packs according to embodiments of the invention are described and depicted in conjunction with a separate humidification unit. However, it would be evident that within other embodiments of the invention the blower pack may form part of a single integrated unit with the humidification system.

Referring to FIG. 1A there are depicted first to fourth configurations 100A to 100D respectively for humidification systems exploiting blower packs according to an embodiment of the invention in conjunction with ultrasonic humidification units. First configuration 100A comprises a pair of blower packs 110A and 110B respectively coupled to a first ultrasonic humidification unit 130A via first and second ducting 150A and 150B respectively. Second configuration similarly comprises a pair of blower packs 110C and 110D respectively coupled to a second ultrasonic humidification unit 130B via first ducting 150C to the second blower pack 110D whilst other ducting is coupled to the first blower pack 110C on the other side of a divider 140, e.g. a wall, to that of the second blower pack 110D.

Figure 1B:
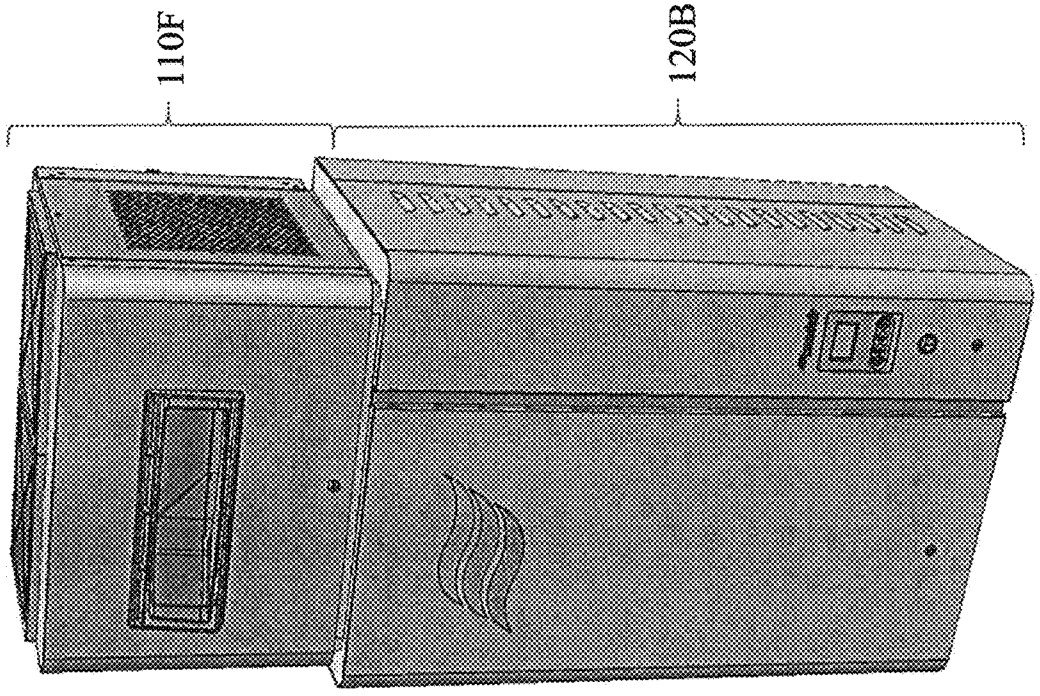
FIG. 1B depicts an exemplary configuration for a mist humidifier exploiting a blower pack according to an embodiment of the invention in direct connection to the humidification system.

Third configuration 100C comprises a single blower pack 110E coupled to a third ultrasonic humidification unit 120A via ducting 150D. Fourth configuration 100D comprises a single blower pack 110F directly coupled to a fourth ultrasonic humidification unit 120B. FIG. 1B depicts a larger scale image of the fourth configuration 100D for a mist humidifier with blower pack 110F and ultrasonic humidification unit 120B.

Accordingly, through combinations of one or more blower packs with different humidification units a range of humidification capacities can be provided. For example, a humidification unit such as first ultrasonic humidification unit 130A or second ultrasonic humidification unit 130B may provide capacities up to 18 kg/hr. (approximately 401b/hr.) in modular increments of 6 kg/hr. (approximately 131b/hr.) through a pair of blower packs whilst third ultrasonic humidification unit 120A and fourth ultrasonic humidification unit 120B may provide capacities to 9 kg/hr. (approximately 201b/hr.) in modular increments of 3 kg/hr. (approximately 71b/hr.) with a single blower pack. Other capacities and modularity may be implemented as will be evident from the ensuing description.

Figure 2:
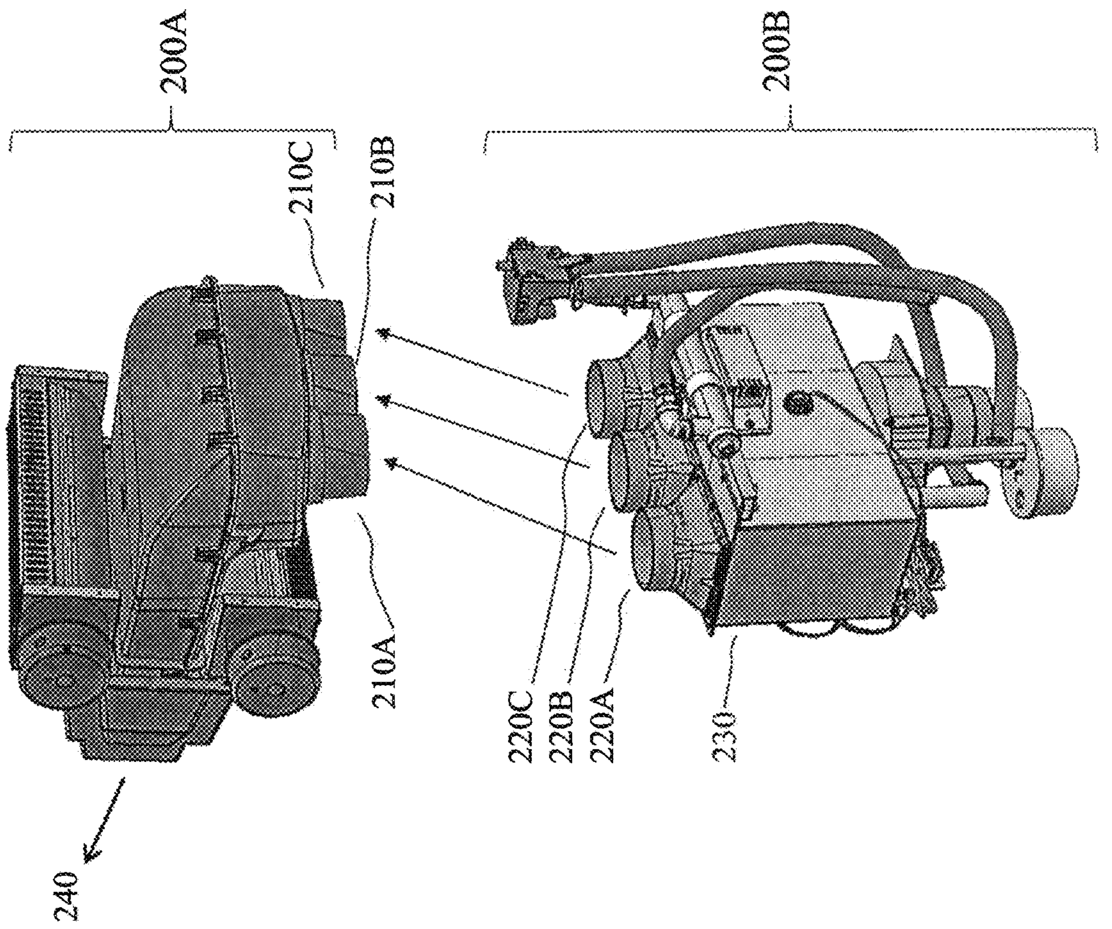
FIG. 2 depicts schematically the internal humidification and blower pack elements of the exemplary configuration of the mist humidifier depicted in FIG. 1B.

Referring to FIG. 2 there are depicted schematically the blower pack element 200A of a blower pack such as blower pack 110 in FIG. 1A and internal humidification element 200B of an ultrasonic humidification unit such as ultrasonic humidification unit 120B in FIG. 1B. Accordingly, the blower pack element 200A comprises first to third inlets 210A to 210C respectively which are combined through the blower pack element 200A into single outlet 240 together with air pulled in by the blower pack element 200A and combined with the mist from first to third inlets 210A to 210C respectively. Each of the first to third inlets 210A to 210C is coupled to a respective one of first to third outlets 220A to 220C of the internal humidification element 200B. The first to third outlets 220A to 220C receive misted air from the misting chamber 230 which may comprise one or more ultrasonic misting sub-assemblies.

Accordingly, if the internal humidification element 200B employs a single ultrasonic misting assembly the misted air may be coupled to first outlet 220A of the internal humidification element 200B to the first inlet 210A of the blower pack 200A. With dual ultrasonic misting assemblies coupled to two of the first to third outlets 220A to 220C may provide misted air from the internal humidification element 200B to the blower pack 200A. With three ultrasonic misting assemblies coupled to the first to third outlets 220A to 220C then these provide misted air from the internal humidification element 200B to the blower pack 200A. Accordingly, as depicted the internal humidification element 200B and the blower pack 200A provide for modular humidification such as described above, for example, with a maximum capacity of 9 kg/hr. (approximately 201b/hr.) provided in modular increments of 3 kg/hr. (approximately 71b/hr.). It would be evident that within other embodiments of the invention the internal humidification element 200B and the blower pack elements 200A may provide a single coupling between the internal humidification element 200B and the blower pack 200A, a dual coupling between the internal humidification element 200B and the blower pack 200A providing bi-level configurability, a triple coupling between the internal humidification element 200B and the blower pack 200A providing three level configurability, or 4, 5, 6 or more etc. according to the design implemented.

The internal humidification element 200B includes a fan, not depicted for clarity, which pushes air into the ultrasonic humidification assemblies creating a misted pressure flow which is then coupled to blower pack 200A. As depicted in FIGS. 1A and 1B respectively the blower pack 200A may be coupled directly to the internal humidification element such as in FIG. 1B or via intermediate tubing such as in first to third configurations 100A to 100C respectively in FIG. 1A. Alternatively, the fan may draw air through the ultrasonic humidification assemblies or multiple fans may draw and push air through the ultrasonic humidification assemblies.

Further, as depicted in FIG. 1A first and second configurations 100A and 10013 respectively may combine dual blower packs 200A in conjunction with a first ultrasonic humidification unit 130A or second ultrasonic humidification unit 130B which each employ a pair of internal humidification elements 200B. Within other embodiments of the invention an ultrasonic humidification unit may employ 3, 4, or more internal humidification elements 200B each coupled to a blower pack 200A. Other configurations may be evident to one of skill in the art.

Figure 3A:
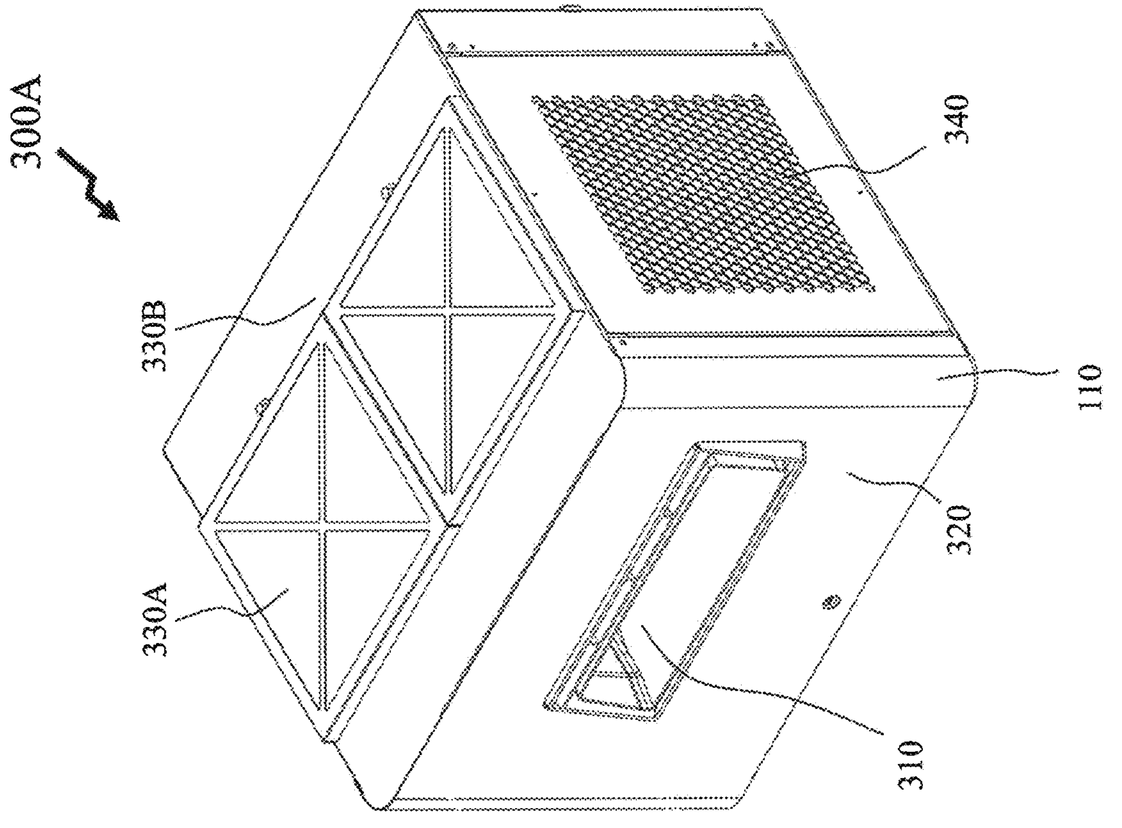
FIG. 3A depicts the external shell of a blower pack element according to an embodiment of the invention as employed in the mist humidifiers depicted in FIGS. 1A and 1B respectively.

Referring to FIG. 3A there is depicted an image 300A of the blower pack 110 employing a blower pack element such as depicted by blower pack element 200A in FIG. 2 according to an embodiment of the invention as employed in the mist humidifiers depicted in FIGS. 1A and 1B respectively. As depicted the blower pack 110 comprises a front panel 320, a mist outlet 310, a side panel 340, a first upper filter assembly 330A and a second upper filter assembly 330B.

Figure 4:
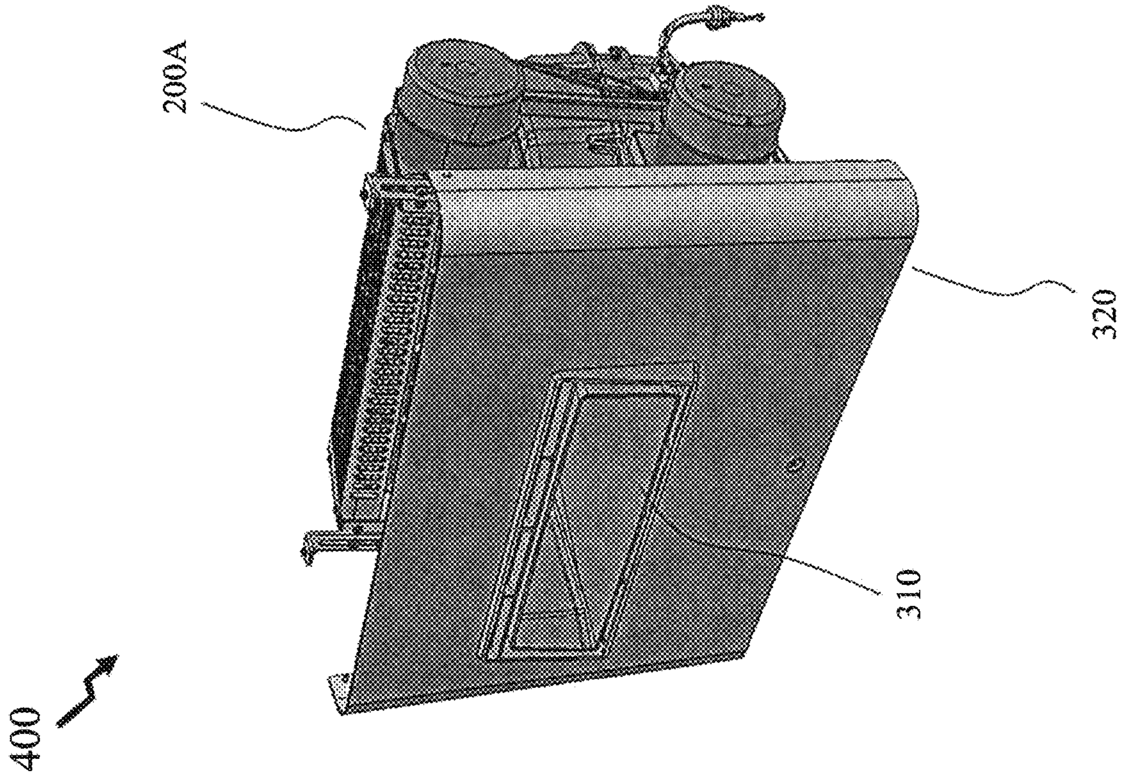
FIG. 4 depicts the blower pack element according to an embodiment of the invention as employed in the mist humidifiers depicted in FIGS. 1A and 1B respectively as depicted in FIG. 3A with only the front plate of the external shell.
Figure 3B:
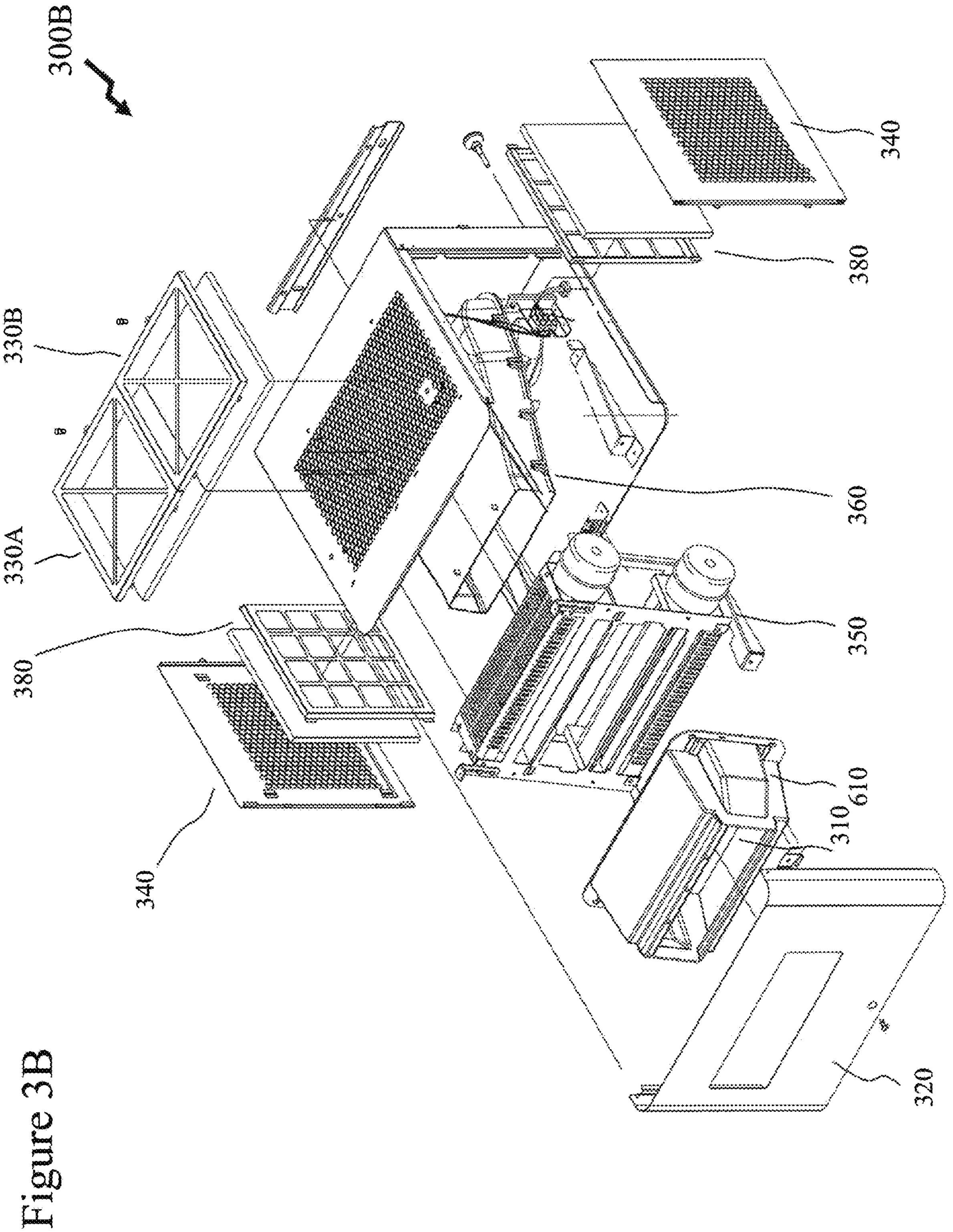
FIG. 3B depicts the blower pack element according to an embodiment of the invention as employed in the mist humidifiers depicted in FIGS. 1A and 1B respectively as depicted in FIG. 3A in exploded form.

Now referring to FIG. 3B there is depicted an image 300B of the blower pack 110 depicted in FIG. 3A in exploded three-dimensional (3D) perspective view. As depicted the blower pack 110 comprises front panel 320, pressurised box 610, fan assembly 350, mist channel 360, left and right side panels 340, the first upper filter assembly 330A and second upper filter assembly 330B together with left and right foam filter/frame elements 380. Also depicted is the mist outlet 310. Referring to FIG. 4 there is depicted the blower pack element according to an embodiment of the invention as employed in the mist humidifiers depicted in FIGS. 1A and 1B respectively as depicted in FIGS. 3A and 3B with only the front plate of the external shell together with blower pack element 200A showing the mist outlet 310.

Figure 6:
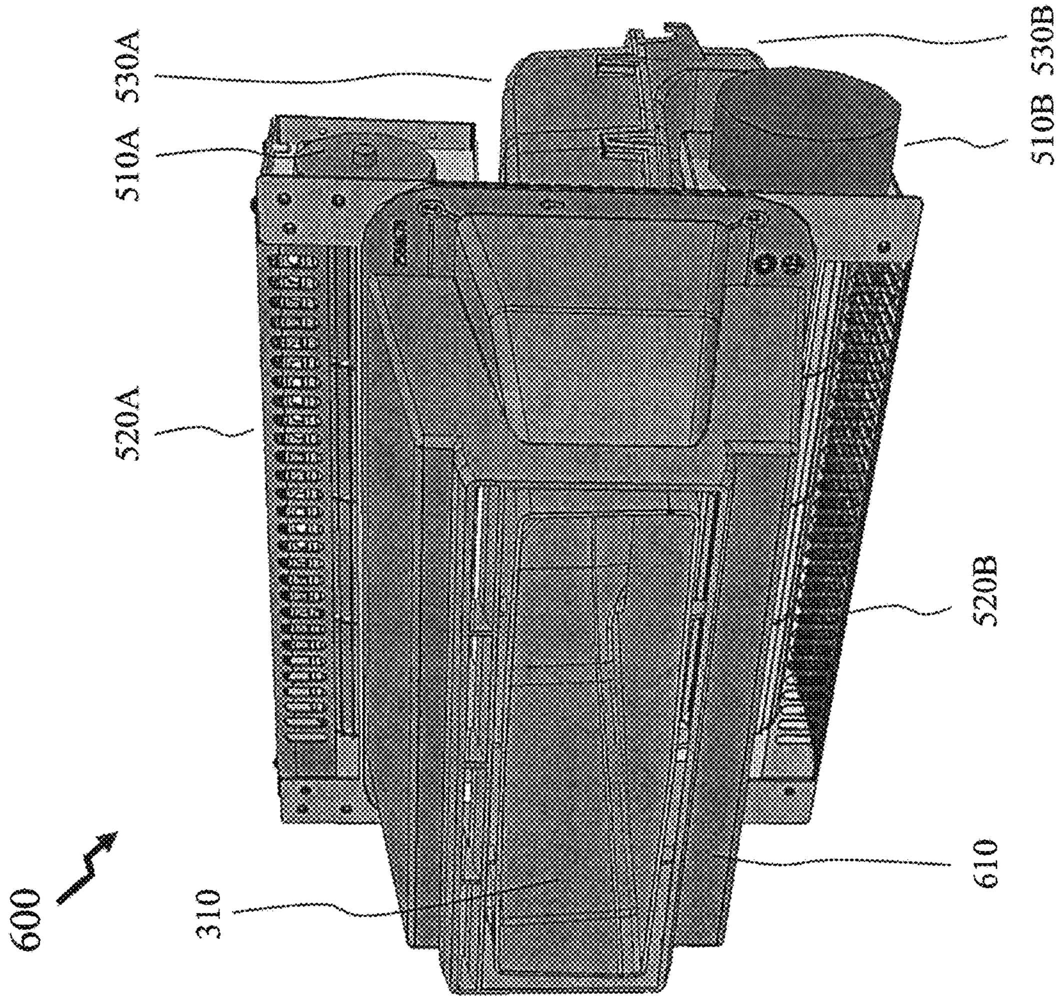
FIGS. 5 and 6 respectively depict rear and front perspective views of an exemplary blower pack according to an embodiment of the invention.
Figure 5:
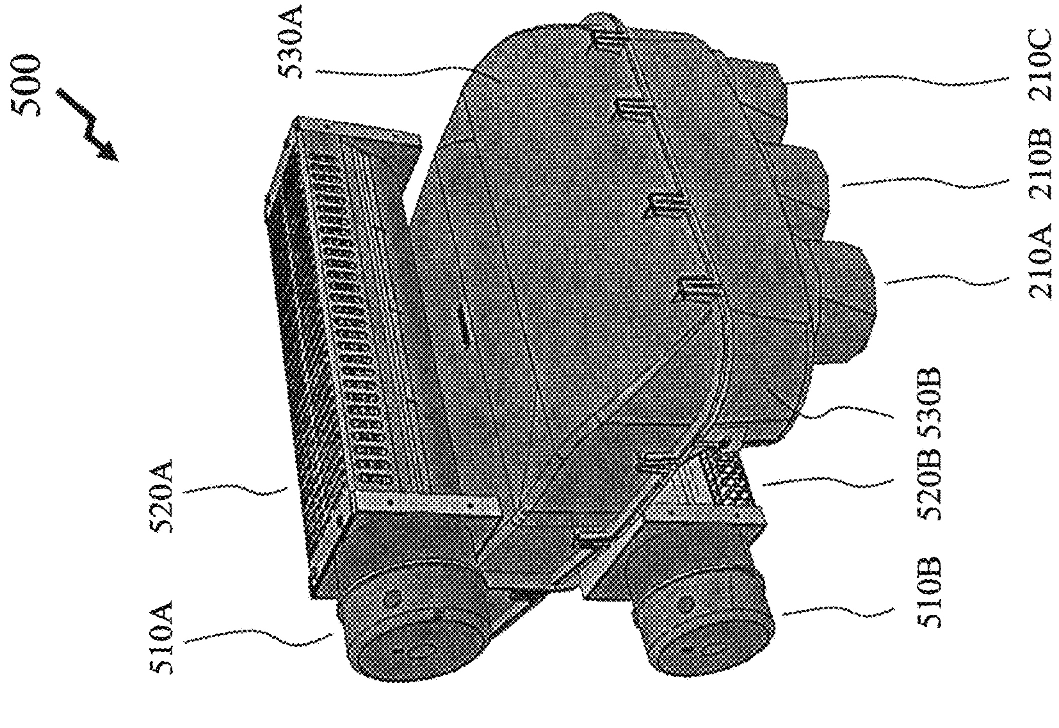

Referring to FIGS. 5 and 6 respectively images 500 and 500 respectively depict rear and front perspective views of an exemplary blower pack element according to an embodiment of the invention such as depicted by blower pack element 200A in FIG. 2. Referring to image 500 in FIG. 5 the blower pack element is depicted in a rear perspective view comprising upper fan 510A, first cover 520A, lower fan 510B, second cover 520B which form part of a fan assembly such as fan assembly 350 in FIG. 3B. Also depicted are upper body portion 530A and lower body portion 530B which form the mist channel 360. Also depicted within the lower body portion 530B are first to third inlets 210A to 210C. In image 600 of FIG. 6 the blower pack element is depicted in a rear perspective view comprising upper fan 510A, first cover 520A, lower fan 510B, second cover 520B, upper body portion 530A, lower body portion 530B, pressurised box 610 together with the mist outlet 310.

Figure 8:
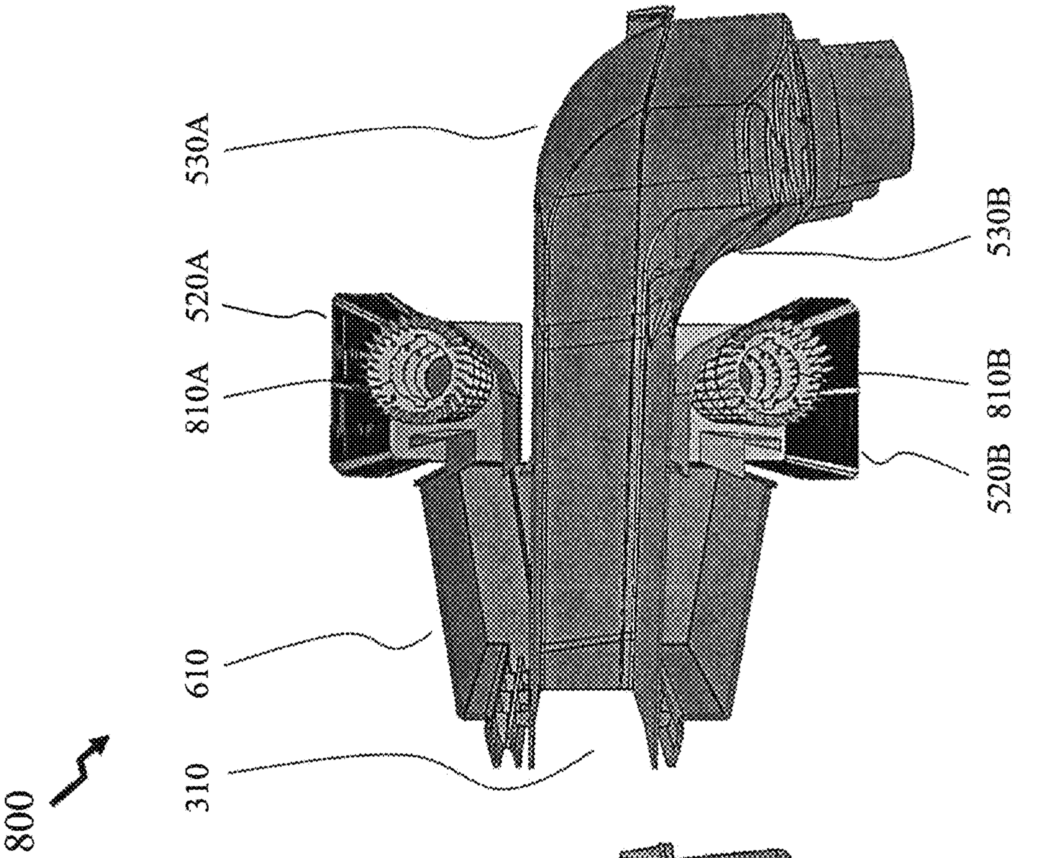
FIGS. 7 and 8 respectively depict a side and cross-sectional side elevation views of an exemplary blower pack according to an embodiment of the invention.
Figure 7:
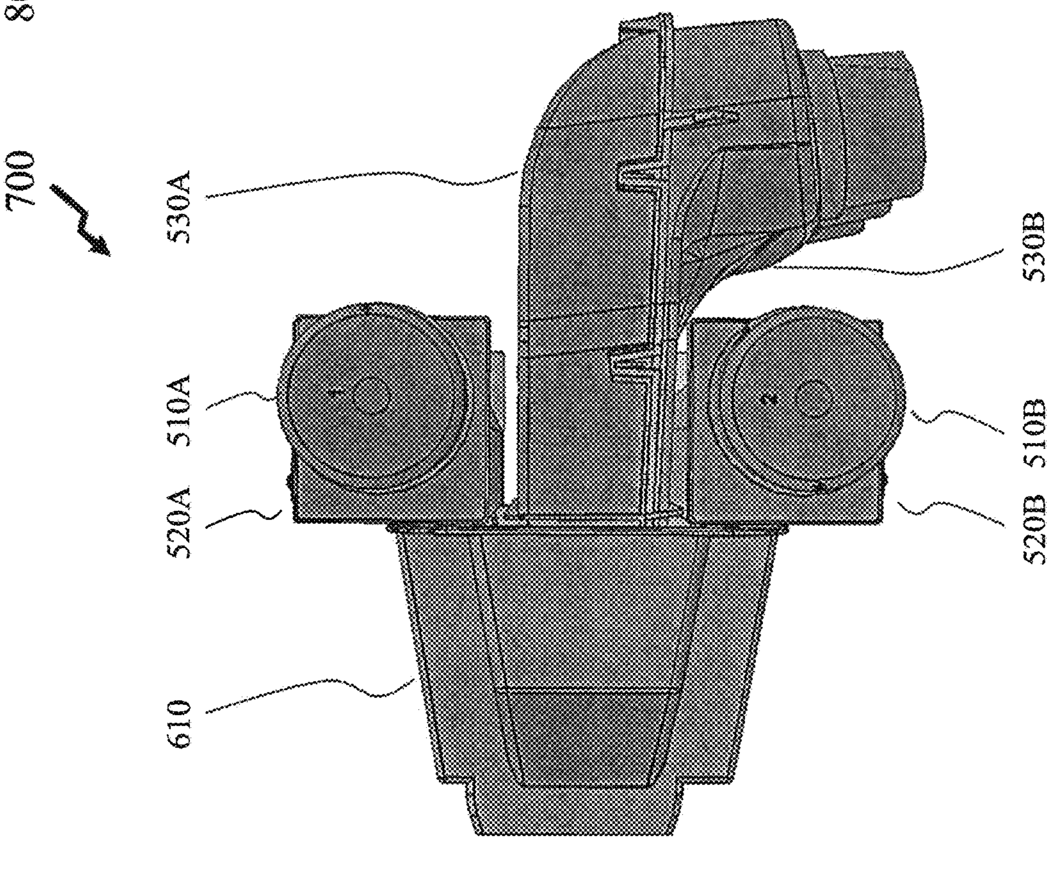

FIGS. 7 and 8 respectively depict images 700 and 800 presenting a side view and cross-sectional side elevation respectively of an exemplary blower pack element according to an embodiment of the invention such as depicted by blower pack element 200A in FIG. 2. As depicted in images 700 and 800 the blower pack element comprises a first cover 520A and second cover 520B which form part of a fan assembly such as fan assembly 350 in FIG. 3B together with upper body portion 530A and lower body portion 530B which form the mist channel 360. The fan assembly 350 as depicted in image 700 also comprises a first fan 510A and a lower fan 510B. These comprise a motor and a blade assembly such that in image 800 the first fan 510A is now depicted by first blade 810A and second fan 510B is now depicted by second blade 810B.

Figure 9:
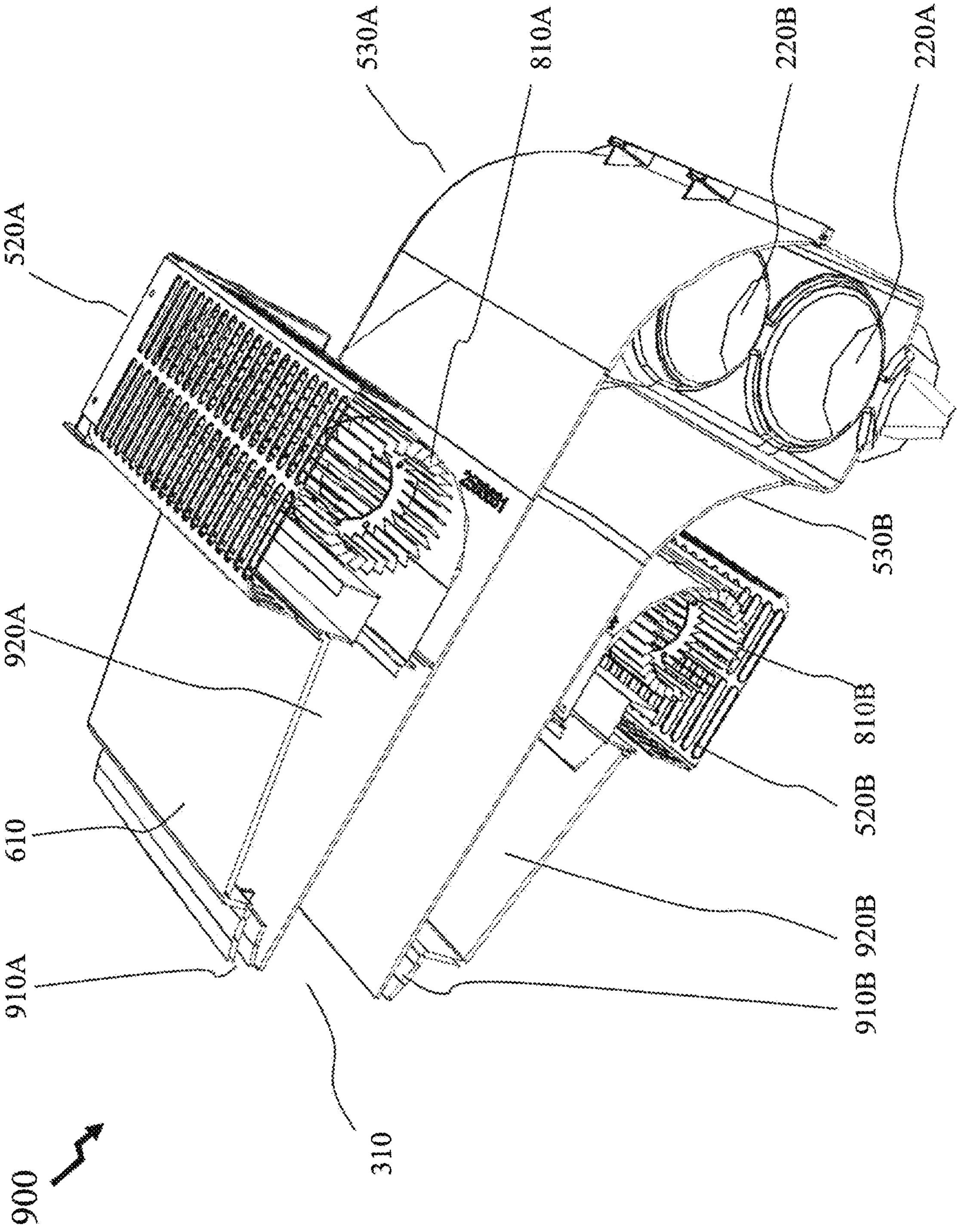
FIG. 9 depicts a rear side cross-sectional perspective view of an exemplary blower pack according to an embodiment of the invention.

Now referring to FIG. 9 image 900 depicts a rear side cross-sectional perspective view of an exemplary blower pack according to an embodiment of the invention such as depicted by blower pack element 200A in FIG. 2. Accordingly, image 900 depicts the mist outlet 310 formed from the pressurised box 610 and mist channel, such as mist channel 360 in FIG. 3B, comprising upper body portion 530A and lower body portion 530B. The lower body portion 530B also showing first and second inlets 220A and 220B respectively. Also depicted are upper cover 520A, lower cover 520B, first blade 810A, and second blade 810B. The mist generated by the humidification element is coupled to the mist channel wherein the pressure flow is coupled to the mist outlet 310. This mist pressure flow as described above therefore propagates through the mist channel to the mist outlet 310. The first blade 810A of the upper fan draws air through the first cover 520A and directs it into upper pressurised chamber 920A of the pressurised box 610 and pushes it through the upper outlet 910A. Similarly, the second blade 810B of the lower fan draws air through the second cover 520B and directs it into lower pressurised chamber 920B of the pressurised box 610 and pushes it through the lower outlet 910B. The air flows from the upper outlet 910A and lower outlet 910B therefore combine with the misted pressure flow to provide the humidified air flow from the humidification system comprising the internal humidification element and blower pack.

Figure 10:
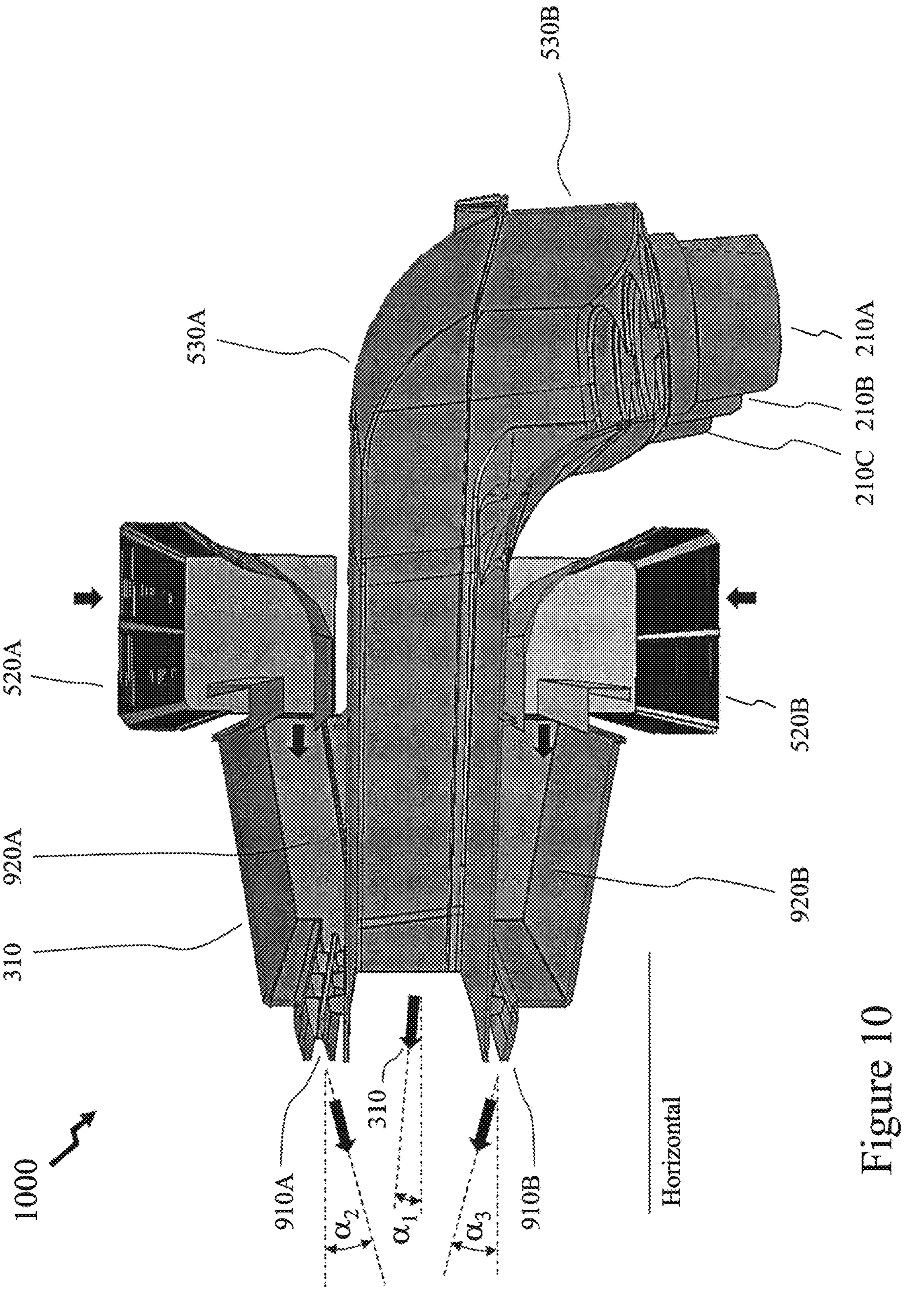
FIG. 10 depicts a side cross-sectional perspective view of an exemplary blower pack according to an embodiment of the invention.

Referring to FIG. 10 image 1000 depicts a side cross-sectional perspective view of an exemplary blower pack according to an embodiment of the invention such as depicted in image 900 in FIG. 9 without the blades of the upper and lower fans. Accordingly, it is evident from image 1000 that the upper outlet 910A has a larger exit area than the lower outlet 910B. When the upper and lower fans are providing the same air flow the lower exit area of the lower outlet 910B relative to the upper exit area of the upper outlet 910A results in air exiting the lower outlet 910B at higher velocity/lower pressure than that from the upper outlet 910B such that the "mist" is not lifted substantially. Now, considering the reverse of the scenario above a lower velocity/higher pressure of the air exiting the lower outlet 910B relative to that of the upper outlet 910B would "lift" the mist projecting it further. Accordingly, by appropriate design of the relative areas of the upper outlet 910A and lower outlet 910B for the same air flow volumes the mist flow from the mist channel can be distributed with different "throws." Accordingly, the effective dispersal distance of the mist can be adjusted through varying the flow rate from the lower outlet 910B relative to the upper outlet 910A.

As depicted in FIG. 10 with image 1000 the mist carrying airflow exits the mist outlet 310 at a first angle, $\alpha_1$, relative to the horizontal. The airflow from the upper outlet 910A in contrast is directed by the upper outlet 910A itself and/or the louvres within the exit portion of the upper outlet 910A at a second angle, $\alpha_2$, relative to the horizontal. The airflow from the lower outlet 910B in contrast is directed by the lower outlet 910B itself and/or the louvres within the exit portion of the lower outlet 910B at a third angle, $\alpha_3$, relative to the horizontal. Accordingly, the airflows from the upper outlet 910A and lower outlet 910B impinge each other at a position in front of the mist outlet 310 established by the relative angular offsets between the airflow from these outlets at the second and third angles, $\alpha_2$ and $\alpha_3$ respectively, and the mist flow at the first angle, $\alpha_1$. Optionally, within embodiments of the invention the relative angular offsets of the second and third angles, $\alpha_2$ and $\alpha_3$ respectively, to the mist flow at the first angle, $\alpha_1$, may be the same. Within other embodiments of the invention the relative angular offsets of second and third angles, $\alpha_2$ and $\alpha_3$ respectively, and the mist flow at the first angle, $\alpha_1$, may be different such that the airflows from the upper outlet 910A and lower outlet 910B impinge the mist flow from the mist outlet 310 at different positions. For example, these relative angular offsets may be between 0° and 5°, between 5° and 10°, between 10° and 15°, between 15° and 20°, between 10° and 20°, between 15° and 25°.

The result of these airflows from the upper outlet 910A and lower outlet 910B impinging upon each other and upon the mist flow is to create turbulence which enhances the absorption of the mist from the mist outlet 310 into the airflows from the upper outlet 910A and lower outlet 910B. This turbulence is important is establishing a relatively short absorption distance, this being the distance required to change the visible water vapour into an invisible gas, in combination with mixing the mist with a large volume of air. Now referring to FIG. 15 there is depicted a cross-sectional plan elevation view in image 1500 of the pressurized box 610 and mist channel for an exemplary blower pack according to an embodiment of the invention. As depicted the lower body portion 530B in combination with upper body portion 520A, not depicted for clarity, provide the mist outlet 310 providing exit flow 1510. Within FIGS. 13 and 14 the upper outlet 910A and lower outlet 910B from the pressurized box were described which as noted above merge to provide a turbulent region to aid in the mixing of the mist with the air from the blower pack. In FIG. 15 there are depicted left side channel 1540 and right side channel 1550 between the pressurized box 610 and the lower body portion 530B (as well as with the upper body portion 530A not depicted for clarity). These provide left flow 1520 and right flow 1530 from the pressurized box which are substantially parallel to the exit flow 1520 at the mist outlet 310, The inventors have established that the left flow 1520 and right flow 1530 reduce recirculation of the mist at the mist outlet which would otherwise create condensates on the side walls of the mist outlet or further back into the mist channel and lead to the potential for spitting of these condensates from the system into the environment. The inventors having further established that if the airflow from each of the left flow 1520 and right flow 1530 are directed inwards towards the mist then the absorption distance increases and there is potential for the condensates, e.g. droplets, to form on the inside of the mist channel side walls. However, if the airflow from each of the left flow 1520 and right flow 1530 are directed away from the mist then there is the potential for these condensates, e.g. droplets, to form on the outside and front surface of the mist channel side walls.

Within other embodiments of the invention the mist outlet, such as mist outlet 310 in FIG. 3, may be filled with a structure to improve the air flow at the mist outlet, such as providing laminar flow for example. An example of such a structure being a honeycomb.

Alternatively, for a given relative areas of the upper outlet 910A and lower outlet 910B the "throw" of the mist flow from the mist channel can be adjusted by adjusting the air flow volumes through the upper and lower pressurised chambers 920A and 920B respectively. This being accomplished by adjusting the relative speeds of the upper and lower fans respectively.

It is also evident from FIG. 10 that the lower and upper inner surfaces of the mist channel is orientated such that it slopes upwards from the first to third inlets 210A to 210C respectively to the mist outlet 310. Accordingly, any condensation onto these results in the water running back down towards the first to third inlets 210A to 210C respectively and therefrom to the internal humidification unit, such as internal humidification unit 200B in FIG. 2B. In this manner, "spitting" of water droplets out from the blower pack element during operation is avoided.

Figure 12:
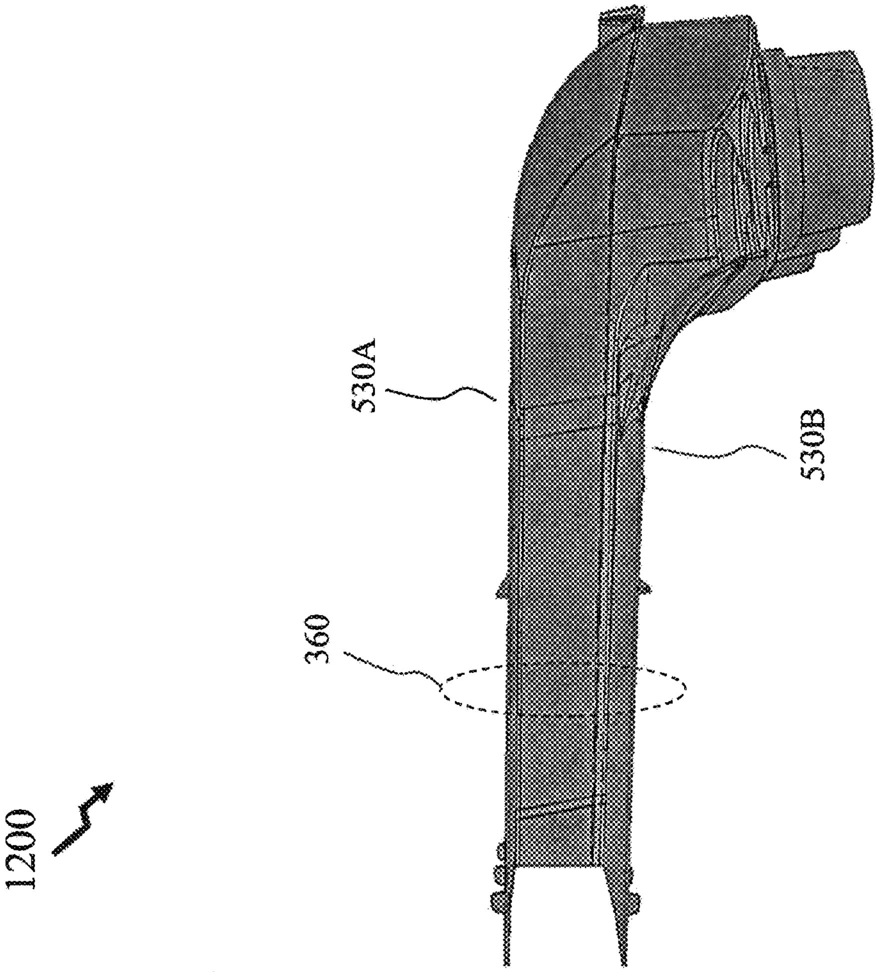
FIGS. 11 and 12 respectively depict cross-sectional side elevation views of the pressurised box and mist channel for an exemplary blower pack according to an embodiment of the invention.
Figure 11:
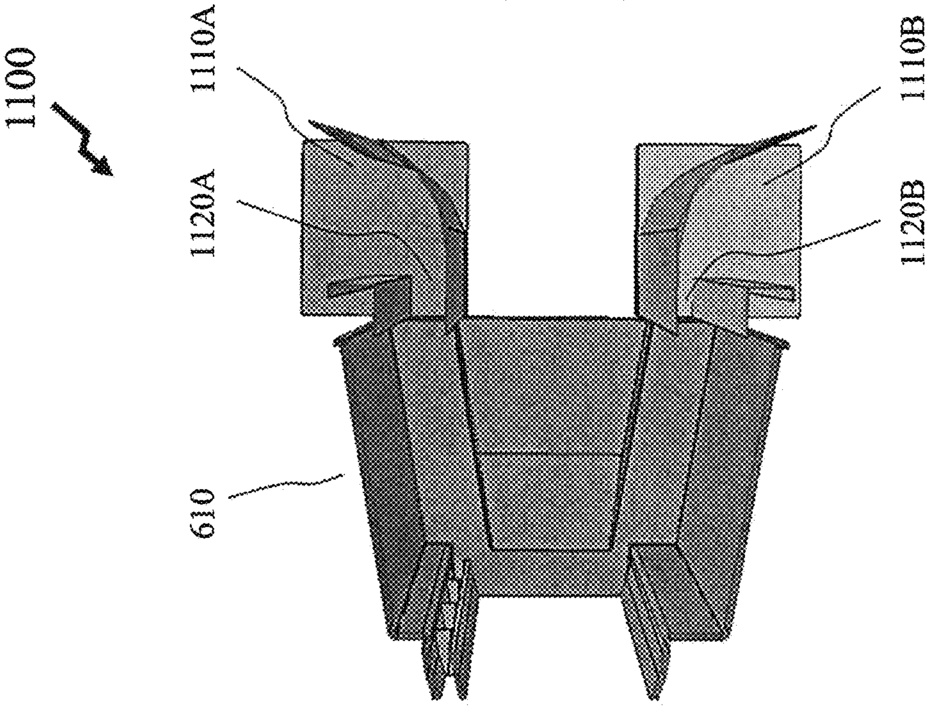

Now referring to FIGS. 11 and 12 respectively there are depicted cross-sectional side elevation views of the pressurised box 610 and mist channel, such as mist channel 360 in FIG. 3B, for an exemplary blower pack according to an embodiment of the invention. The pressurised box 610 is depicted with first and second fan housings 1110A and 1110B respectively in order to show the fan feeds 1120A and 1120B between the first and second fan housings 1110A and 11101B respectively and pressurised box 610. The first and second fan housings 1110A and 1110B respectively forming part of the fan assembly, such as fan assembly 350 in FIG. 3B. As depicted the mist channel, such as mist channel 360 in FIG. 3B, comprises an upper body portion 530A and lower body portion 530B.

Figure 14:
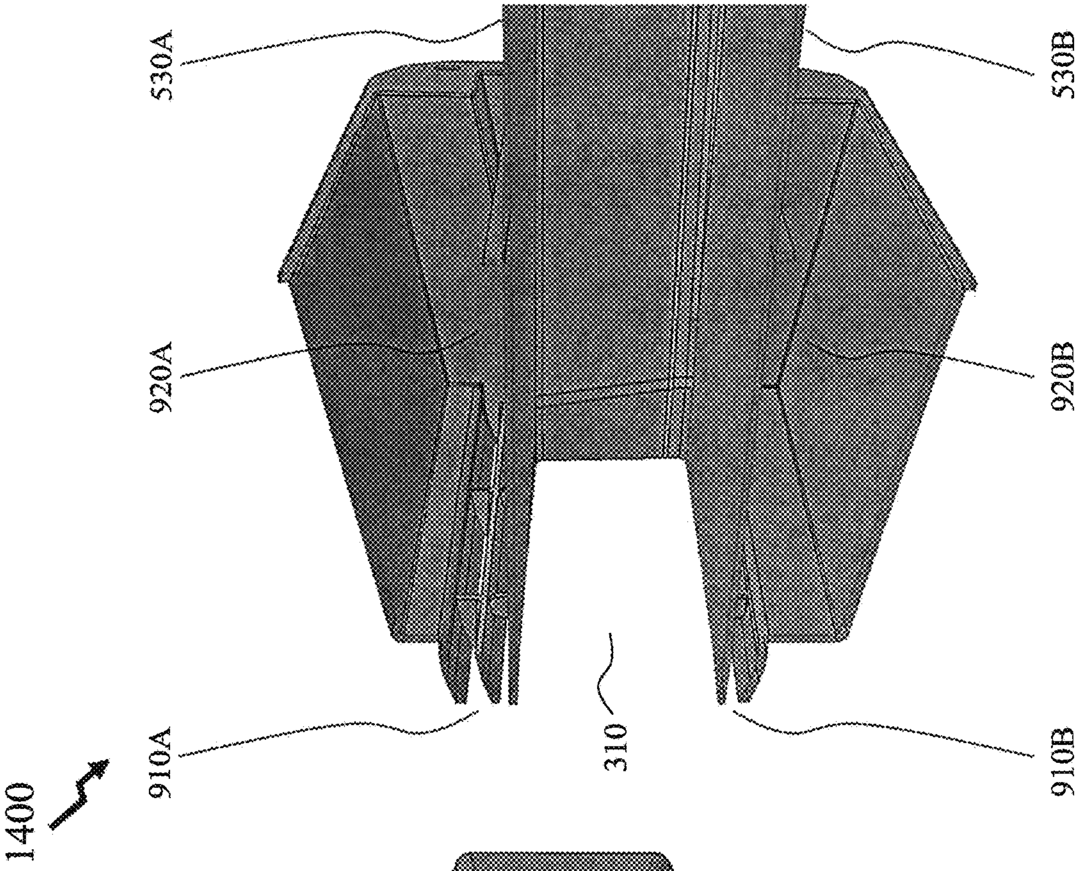
FIGS. 13 and 14 respectively depict a front and side cross-sectional elevation views of the pressurised box and mist channel assembly for an exemplary blower pack according to an embodiment of the invention.
Figure 13:
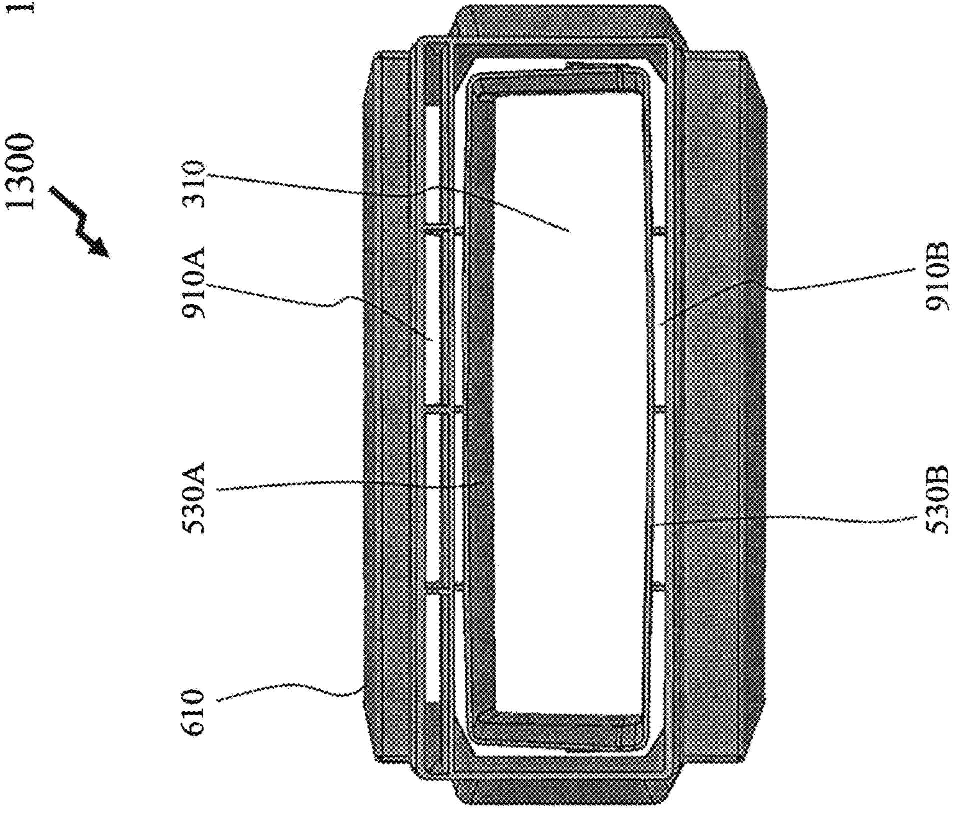
Figure 15:
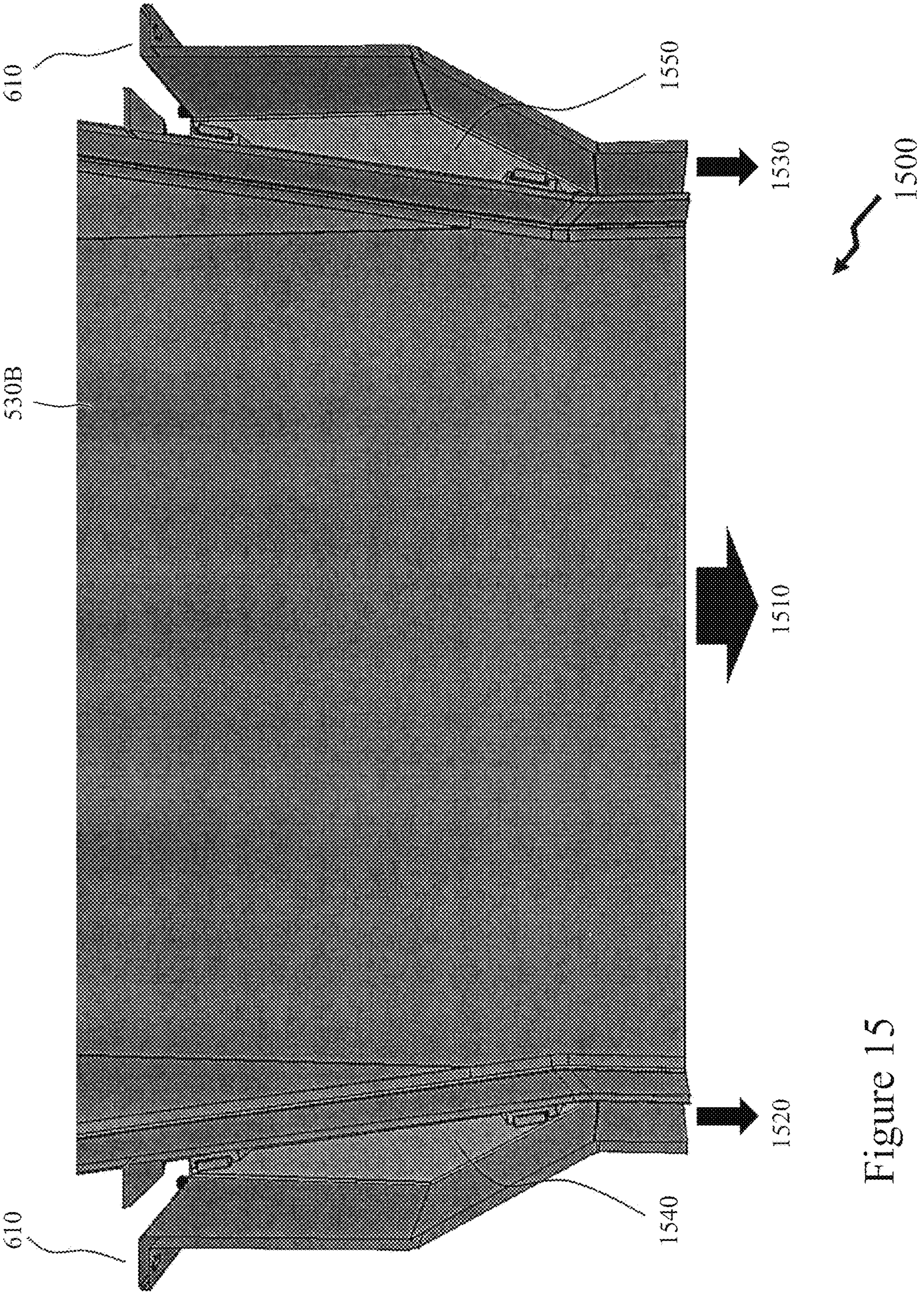
FIG. 15 depicts a cross-sectional plan elevation view of the pressurized box and mist channel for an exemplary blower pack according to an embodiment of the invention.

Also referring to FIGS. 13 and 14 respectively there are depicted a front and side cross-sectional elevation views of the pressurised box 610 and mist channel, such as mist channel 360 in FIG. 3B, assembly for an exemplary blower pack according to an embodiment of the invention. Accordingly, there are depicted the pressurised box 610 surrounding the mist channel, such as mist channel 360 in FIG. 3B, comprising upper body portion 530A and lower body portion 530B thereby forming the upper outlet 910A and lower outlet 910B for the air from the fan(s) within the blower pack element to flow out and mix with/carry the mist from the mist outlet 310.

It is evident from FIGS. 11 to 14 that the end portions of the pressurised box forming the upper and lower outlets 910A and 910B are shaped relative to the mist channel in order to direct their air flow towards the mist as it exits the mist channel. On the lower side with the smaller area this is provided by shaping the lower internal surface of the pressurised box relative to the mist channel and on the upper side with the larger area this is provided by both shaping the upper internal surface of the pressurised box and providing a louvre portion. Within other embodiments of the invention the shaping may be formed solely within the outer surface(s) of the mist channel or it may be formed by shaping of both the outer surface(s) of the mist channel and the inner surface(s) of the pressurised box.

Whilst the mist channel, such as mist channel 360 in FIG. 3B has been depicted and presented as comprising an upper body portion 530A and lower body portion 530B within other embodiments of the invention it may be alternatively formed from a single piece-part or multiple piece parts according to the design, manufacturing and cost constraints/requirements placed upon the overall blower pack element etc. Similarly, whilst the pressurised box has been described and depicted as being a single piece part coupled to the fan assembly other embodiments of the invention the pressurised box may be formed from two or more piece parts again according to the design, manufacturing and cost constraints/requirements placed upon the overall blower pack element etc.

Within the embodiments of the invention depicted the mist channel, such as mist channel 360 in FIG. 3B, has been described and depicted as comprising first to third inlets 210A to 210C respectively which are coupled to the internal humidification element of the humidifier allowing the blower pack to support operation with an internal humidification element providing modular construction/assembly of units with different capacities. For example, with three inlets coupled to three ultrasonic mist chambers then the unit can be implemented with one, two or three ultrasonic generators providing configurability at three capacities. If the ultrasonic generators are employed in conjunction with a single water chamber with fully implemented ducting between the mist channel and reservoir with ultrasonic generators, then any condensation within the mist channel returns to the reservoir through the inlets. However, if the design provides multiple reservoirs then the humidification system may employ different ducting to route all the inlets back to the active reservoirs within the internal humidification elements. Alternatively, the mist channel may be designed with replaceable sections at the rear distal to the mist outlet such that only the required number of inlets are provided, and blank panels are employed for the remainder such that all condensation routes onto to the active inlets. This thereby avoiding potential for water to accumulate within inactive ducts/ultrasound generators etc.

Within the embodiments of the invention depicted the mist channel, such as mist channel 360 in FIG. 3B, has been described and depicted as being a single open channel from the inlet(s) to the outlet. However, within other embodiments of the invention the mist channel may comprise internal dividers, such as for example, to direct mist flow from the inlets individually before being combined within the mist channel or at/after the mist outlet. Optionally, within other embodiments of the invention multiple discrete mist channels may be employed with a single common pressurised box wherein the multiple mist channels are combined at the mist outlet or prior to the mist outlet. Optionally, within other embodiments of the invention multiple discrete mist channels may be employed with multiple pressurised boxes which are coupled to a common fan assembly such that the multiple mist channels are coupled to the same fan(s). Optionally, within other embodiments of the invention multiple discrete mist channels may be employed with multiple pressurised boxes which are coupled to multiple fan assemblies such that each mist channel/pressurised box combination is coupled to a different fan(s) than the other mist channel/pressurised box combinations.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Within the description above in respect of FIGS. 1A to 15 the pressurised box has openings to the sides of the mist channel as well as above and below the mist channel. Within other embodiments of the invention these side openings may be omitted, have different relative areas to the upper/lower openings, and have different relative areas to each other.

Within the description above in respect of FIGS. 1A to 15 the mist channel and pressurised box are presented as having an aspect ratio wherein relative to a horizontal plane the width is larger than the height. However, other embodiments of the invention the aspect ratio may be larger than that depicted/described, lower than that described/depicted, and have larger height than width.

Within the description above in respect of FIGS. 1A to 15 the mist channel and pressurised box are presented as having an overall essentially rectangular cross-section towards the mist outlet where the pressurised box surrounds the mist channel. However, it would be evident that within other embodiments of the invention the geometry of the pressurised box and mist channel may be square, circular, elliptical, polygon, or defined by a mathematical function etc. Optionally, the geometry of the pressurised box and mist channel may be the same or different.

Whilst within embodiments of the invention the pressurised box of the blower pack has been described and depicted as employing one or more fans to generate the airflow for combining with the mist flow it would be evident that within other embodiments of the invention that the fan(s) may be replaced with another element(s) generating a flow including, but not limited to, a compressor and an outlet of a tank of liquefied gas (e.g. nitrogen) or a subliming material (e.g. carbon dioxide, also known as dry ice). Such systems may support sporadic and/or one off use rather than continuous or pseudo-continuous use. Further, the description above in respect of FIGS. 1A to 14 presumes the same gas is employed in the upper and lower portions of the pressurised box whilst these may be different in other embodiments of the invention. Further, the gas may be cooled and/or heated prior to coupling to the pressurised box.

Within the description above in respect of FIGS. 1A to 15 the embodiments of the invention have been described with respect to mist humidification systems wherein a liquid, e.g. water, is dispersed is mist form within an environment by initially transporting the mist with a first gas, e.g. air, and then combining this liquid/first gas with a second gas, e.g. air, to project or "throw" the mist into the environment. Accordingly, it would be evident that within other embodiments of the invention that other liquids may be dispersed into an environment in mist form either discretely or in conjunction with another liquid forming part of the mist. It would be further evident that within other embodiments of the invention that the first gas/second gas may be other than air.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of transporting a mist of a liquid carried by a first gas into an environment, comprising:

providing a mist generator for generating the mist of the liquid within the first gas;

providing a mist channel comprising an inlet for receiving an output of the mist generator and an outlet;

providing a blower pack around the outlet of the mist channel for generating a flow of a second gas which is combined with a flow of the mist from the outlet of the mist channel; wherein the blower pack when operating projects the mist into the environment from the outlet of the mist channel;

providing the blower pack comprises providing the mist channel and a pressurised box where the mist channel and the pressurised box are mechanically mounted to the blower pack; and providing the pressurised box comprises:

providing a first portion enclosing a first predetermined portion of the mist channel on a first side of the mist channel having an opening at the outlet of the mist channel and an inlet at a second distal end; and providing a second portion enclosing a second predetermined portion of the mist channel on a second side of the mist channel having an opening at the outlet of the mist channel and an inlet at a second distal end;

wherein at least one of a lower internal surface of the mist channel and an upper internal surface of the mist channel have a slope relative to a horizontal plane of the blower pack from the outlet of the mist channel towards the inlet of the mist channel.

2. The method according to claim 1, wherein the inlet of the mist channel comprises a plurality of inlet ports each for coupling to a duct and therein to an output port of the mist generator; wherein the blower pack can be mounted to a physical object in the environment.

3. The method according to claim 1, wherein an inner surface of the first portion of the pressurised box is profiled relative to an external surface of the first predetermined portion of the mist channel to direct air flow within first portion of the pressurised box towards the outlet of the mist channel; and an inner surface of the second portion of the pressurised box is profiled relative to an external surface of the second predetermined portion of the mist channel to direct air flow within second portion of the pressurised box towards the outlet of the mist channel.

4. The method according to claim 3, wherein the first portion of the pressurised box further comprises a louvre; and the louvre is disposed between the inner surface of the first portion of the pressurised box and the external surface of the first predetermined portion of the mist channel.

5. The method according to claim 1, wherein a first outlet area of the blower pack is larger than a second outlet area of the blower pack; and the first outlet area of the blower pack is between an inner surface of the first portion of the pressurised box and an external surface of the first predetermined portion of the mist channel, the second outlet area of the blower pack is between an inner surface of the second portion of the pressurised box and an external surface of the second predetermined portion of the mist channel.

6. The method according to claim 5, further comprising:

providing a third outlet area of the blower pack;

providing a fourth outlet area of the blower pack; wherein the first side of the pressurized box is its upper surface; the second side of the pressurized box is its lower surface; the pressurised box extends around the mist channel, the third outlet area is that portion of an area between the pressurised box and the mist channel not including the first outlet area and the second outlet area on a first side of the blower pack between the inner surface of the first portion of the pressurised box and the external surface of the first predetermined portion of the mist channel and the inner surface of the first portion of the pressurised box; and the fourth outlet area is that portion of an area between the pressurised box and the mist channel not including the first outlet area and the second outlet area on a second side of the blower pack distal to the first side of the system between the inner surface of the first portion of the pressurised box and the external surface of the first predetermined portion of the mist channel and the inner surface of the first portion of the pressurised box.

7. The method according to claim 6, wherein a first airflow from the third outlet area is approximately parallel to a second airflow from the mist channel; and a third airflow from the fourth outlet area is approximately parallel to the second airflow from the mist channel.

8. The method according to claim 1, wherein a first airflow from the first portion of the pressurized box is towards a second airflow from the mist channel has a first angle relative to an axis perpendicular to the outlet of the mist channel; and a third airflow from the second portion of the pressurized box is towards the second airflow from the mist channel has a second angle relative to an axis perpendicular to the outlet of the mist channel.

9. The method according to claim 8, wherein each of the first angle and the second angle are one of between 0° and 5°, between 5° and 10°, between 10° and 15°, between 15° and 20°, between 10° and 20°, between 15° and 25°.

10. The method according to claim 1, wherein a first outlet area of the blower pack is larger than a second outlet area of the blower pack;

the first portion of the pressurised box is coupled to a first source of the second gas;

the second portion of the pressurised box is coupled to a second source of the second gas;

the first outlet area of the blower pack is between an inner surface of the first portion of the pressurised box and an external surface of the first predetermined portion of the mist channel; and the second outlet area of the blower pack is between an inner surface of the second portion of the pressurised box and an external surface of the second predetermined portion of the mist channel.

11. The method according to claim 7, further comprising:

adjusting a velocity of a flow of the second gas from the first outlet area of the blower pack relative to a second velocity of a second flow of the second gas from the second outlet area of the blower pack; wherein the relative different between the first velocity and the second velocity adjusts a projection distance of the mist from the outlet of the mist channel.

* * * * *